United States Patent [19]
Roger et al.

[11] Patent Number: 5,273,484
[45] Date of Patent: Dec. 28, 1993

[54] FOOD-PROCESSING APPARATUS

[75] Inventors: Alexander Roger, Inverurie; William A. Johnston, Aberdeen, both of Scotland

[73] Assignee: British Technology Group Ltd., London, England

[21] Appl. No.: 839,562

[22] Filed: Feb. 24, 1992

[30] Foreign Application Priority Data

Feb. 25, 1991 [GB] United Kingdom ............ 9103865

[51] Int. Cl.⁵ .................................................. A22C 7/00
[52] U.S. Cl. .................................... 452/174; 452/182; 426/513
[58] Field of Search .................... 452/174, 182, 183; 426/513, 282

[56] References Cited

U.S. PATENT DOCUMENTS

| | | | |
|---|---|---|---|
| 1,960,517 | 5/1934 | Taylor | 452/174 |
| 3,433,647 | 3/1969 | Johnston | 99/111 |
| 3,913,175 | 10/1975 | Peterson | 426/513 |
| 4,126,704 | 11/1978 | McCarthy et al. | 426/304 |
| 4,276,318 | 6/1981 | Orlowski et al. | 426/513 |
| 4,329,828 | 5/1982 | Wagner | 426/513 |
| 4,474,823 | 10/1984 | Nishikawa et al. | 426/643 |
| 4,615,076 | 10/1986 | Shimokawa | 426/513 |
| 4,646,385 | 3/1987 | Roberts et al. | 426/513 |
| 4,872,241 | 10/1989 | Lindee | 426/513 |
| 4,996,743 | 3/1991 | Janssen | 426/513 |
| 5,030,164 | 7/1991 | Wagner | 452/174 |

FOREIGN PATENT DOCUMENTS

| | | |
|---|---|---|
| 741537 | 12/1969 | Belgium . |
| 0919495 | 1/1973 | Canada . |
| 447003 | 9/1991 | European Pat. Off. . |
| 3010265 | 10/1980 | Fed. Rep. of Germany . |
| 7401537 | 1/1970 | France . |
| 2297168 | 1/1975 | France . |
| 2609869 | 7/1988 | France . |
| 345329 | 3/1931 | United Kingdom . |
| 825728 | 12/1959 | United Kingdom . |
| 1086906 | 10/1967 | United Kingdom . |
| 1270295 | 4/1972 | United Kingdom . |
| 1293170 | 10/1972 | United Kingdom . |
| 1370228 | 10/1974 | United Kingdom . |
| 2094258 | 9/1982 | United Kingdom . |

*Primary Examiner*—Willis Little
*Attorney, Agent, or Firm*—Cushman, Darby & Cushman

[57] ABSTRACT

An apparatus for forming a reconstituted food product is provided including at least one transfer hopper having a reciprocating bottom for supporting pieces of the food product at a loading location, a control member for reciprocating the bottom so as to alter the height of the bottom in relation to a load in the hopper thereby keeping a drop height of successive pieces of food product into the hopper within predetermined limits. A drive mechanism is provided for moving the hopper from a food product loading location to a discharge location. A mould is disposed at the discharge location and aligned with the hopper. A displacement member for displacing material from the hopper into the mould is provided. The apparatus further includes structure for separating material in the mould from material remaining in the hopper, a second drive member for moving the loaded mould to a demoulding location, a conveying member disposed from the demoulding location to a discharge position, and expulsion structure disposed at the demoulding location for expelling material from the mould to the conveyor member.

26 Claims, 11 Drawing Sheets

FOOD-PROCESSING APPARATUS

The present invention relates to food-processing apparatus and in particular, but not exclusively, to apparatus for the re-forming of fish fillets.

The fish wholesale and retail markets aim to provide specific weights of fillet or fillet products for their customers but as, at any given moment, fillets of the right size may be difficult to obtain at an acceptable price from the suppliers, it becomes necessary to cut off portions from oversize fillets and to add portions to undersize fillets to satisfy customer demand. When done by hand, this is a labour-intensive and hence expensive process and as a result fish-reforming machines have already been built which can produce from the fillets a fish portion of the desired size e.g. 100 g in the case of the fish frying trade.

The principal drawback of these known machines is that in forming the fillet product, they tend to comminute and destroy the characteristic flaky texture of the natural fillet.

One of the objects of the present invention is to provide a means of processing fish, meat and poultry etc. in which this drawback is avoided or reduced.

According to a first aspect of the present invention, an apparatus for forming a reconstituted food product comprises an assembly for loading constituent pieces for the product, a transfer unit, a re-forming assembly operative to produce the product in the desired shape, and a product demoulding assembly.

Conveniently, the loading assembly comprises a substantially horizontal input conveyor which is continuously moved bodily backwards and forwards and from side-to-side in controlled fashion to ensure that the constituent pieces for the product are evenly spread across the floor of the transfer unit.

The transfer unit comprises a hopper with a movable floor-defining member in which the position of the floor-defining member is controlled by an expansion member which at the maximum extension allowed brings the floor-defining member at or adjacent the top of the hopper thereby to encourage the constituent pieces for the product to maintain their horizontal disposition when they are discharged into the hopper.

Conveniently, when the hopper is fully loaded, the floor-defining member will lie adjacent the bottom edges of the hopper walls and in the same plane as a support table shaped to receive the floor-defining member.

The hopper is one of a number of such hoppers supported on an indexing unit, which indexing unit rotates, at the appropriate moment, by the amount required to bring the empty next hopper adjacent the input conveyor while a hopper which has been already loaded from the input conveyor is moved on to the re-forming assembly, whereupon the expansion member is re-expanded to return the floor-defining member to its original height at the top of said empty hopper and allow loading to continue as before.

Conveniently, the expansion member is provided by a bellows operative to move the floor-defining member from one setting to the next in response to the detection of said constituent pieces on the input conveyor, whereby, on entering the hopper, said constituent pieces only experience a minimal drop and retain their disposition.

The re-forming assembly comprises a plunger adapted to enter the top of the newly arrived hopper, a convergent section, and a mould separated from the convergent section by a cutter plate.

The cutter plate is supported for movement in an inclined plane between a first position, in which a correspondingly shaped aperture in the cutter plate aligns with the lower end of the hopper bore, and a second position in which access to the hopper space is sealed off by an uninterrupted second of the cutter plate.

The mould has a tapering underside engaged by two mutually inclined discharge belts for the demoulded products.

The inclination of the belts is maintained beneath the mould by a suitably-profiled belt-supporting block.

The mutually inclined discharge belts are supported upstream of the mould by a waisted roller or like support means which is driven via a sprag-clutch or the like so as to give an intermittent motion to the two belts which intermittent motion results in the mould moving away from the re-forming assembly without relative motion between the mould and the supporting belts, whereas when the mould is moved back to its original position, the sprag clutch or the like freewheels and the two discharge belts remain stationary.

Conveniently, the waisted roller or like support means is driven via the sprag clutch by a sprocket wheel and the mould is supported on a carriage connected with a link of a drive chain for said sprocket wheel.

The discharge ends of the two discharge belts are supported at the desired mutual inclination by a suitably profiled auxiliary roller which is mounted so that it can move downwardly with the reconstituted food products when these latter are released from the mould by the plunger of the demoulding assembly thereby to ensure that said products continue to be firmly supported even when they have left the confines of the mould.

Conveniently, following demoulding of a reconstituted food product, the two discharge belts are not raised again until the mould has been returned to the re-forming assembly for a repeat operation.

The apparatus includes a take-off conveyor to transfer the reconstituted food products from the discharge conveyor assembly to a freezer loading belt, said take-off conveyor comprising a shuttle conveyor adapted to move intermittently in synchronism with the intermittently moving discharge belts whereby, in operation, the discharge end of the shuttle conveyor withdraws from a first position in which, nose down, it deposits a first of a row of the reconstituted food products on the far side of the freezer loading belt and a second position in which it deposits the last of the row of reconstituted food products on the near side of the freezer loading belt before raising its nose and returning to the far side of the freezer loading belt for deposit of the next row of reconstituted food products to be frozen, the operation speeds of the various components involved being such that by the time the nose position of the shuttle conveyor has dropped down for discharge onto the far side of the freezer loading belt again, the previous row of reconstituted food deposited there will have move clear of the shuttle conveyor.

The demoulding assembly may be swung to one side to allow a newly-loaded loading assembly to be brought into place for subsequent demoulding.

The loading assembly for the constituent pieces for the product includes a conveyor belt and a retractable table which, at its highest position, is immediately below the end of the conveyor belt where, as each said piece on the conveyor belt passes beneath an appropriate detector, a signal from the detector is sent to a control mechanism controlling the position of the table to cause the retractable table to drop slightly whereby to ensure that the said piece drops a minimum distance and is therefore more likely to stay in a horizontal position.

The conveyor belt reciprocates and moves from side-to-side ensuring an even spread of the constituent pieces for the product on the table.

Conveniently, when the table has dropped to a predetermined position, the conveyor belt stops, a first pusher moves the stack of orientated pieces across to a position opposite a waiting hopper, and a second pusher acting at right angles to the first pusher pushes the stack of pieces into the hopper.

The after retraction of the two pushers, a press moves down into the hopper and squeezes the constituent pieces for the product through a converger into a moulding section for the product whereby, when the press has dropped to a predetermined point, the press retracts, the table returns to its original position for reloading and the cycle is repeated with a new batch of said pieces.

According to a second aspect of the present invention, an apparatus for forming a reconstituted food product includes a mould for shaping the product and means for expelling the product from the mould without substantial compression of the product.

According to a third aspect of the present invention, an apparatus for forming a reconstituted food product includes a hopper or other container, means for expelling material from the container into a mould, means for separating the material in the mould from that remaining in the container, and means for removing from the mould the product thus formed.

According to a fourth aspect of the present invention, an apparatus for forming a reconstituted food product includes loading, moulding, demoulding and transfer assemblies wherein, in all but the moulding assembly, the constituent pieces for the product and the product formed in the apparatus are supported by a base support moving down therewith during loading or demoulding as the case may be.

According to a fifth aspect of the present invention, and apparatus for forming a reconstituted food product in which the product is a fish product, the apparatus includes a mould having a coffin-shaped internal plan shape, a bottom surface which in transverse section tapers downwardly in a shallow V-shape, and cutting means operating above the mould in a plane which inclines upwardly from the foot of the coffin-shape towards its head. Clearly, the invention also includes such an apparatus when re-oriented e.g. so that the bottom surface of the mould now becomes the top or side surface and the cutting means operates beneath or beside the mould.

According to a sixth aspect, the present invention includes a method of processing fish or other food material to form a reconstituted food product substantially as hereinafter described.

Other aspects of the invention will also be apparent to those skilled in the art e.g. the detailed design of the various components used and the control circuitry etc.

The apparatus and methods of the present invention find application in the processing of fish, meat and poultry etc.

Embodiments of the invention will now be described, by way of example only, with reference to the accompanying drawings in which.

Figure 1:
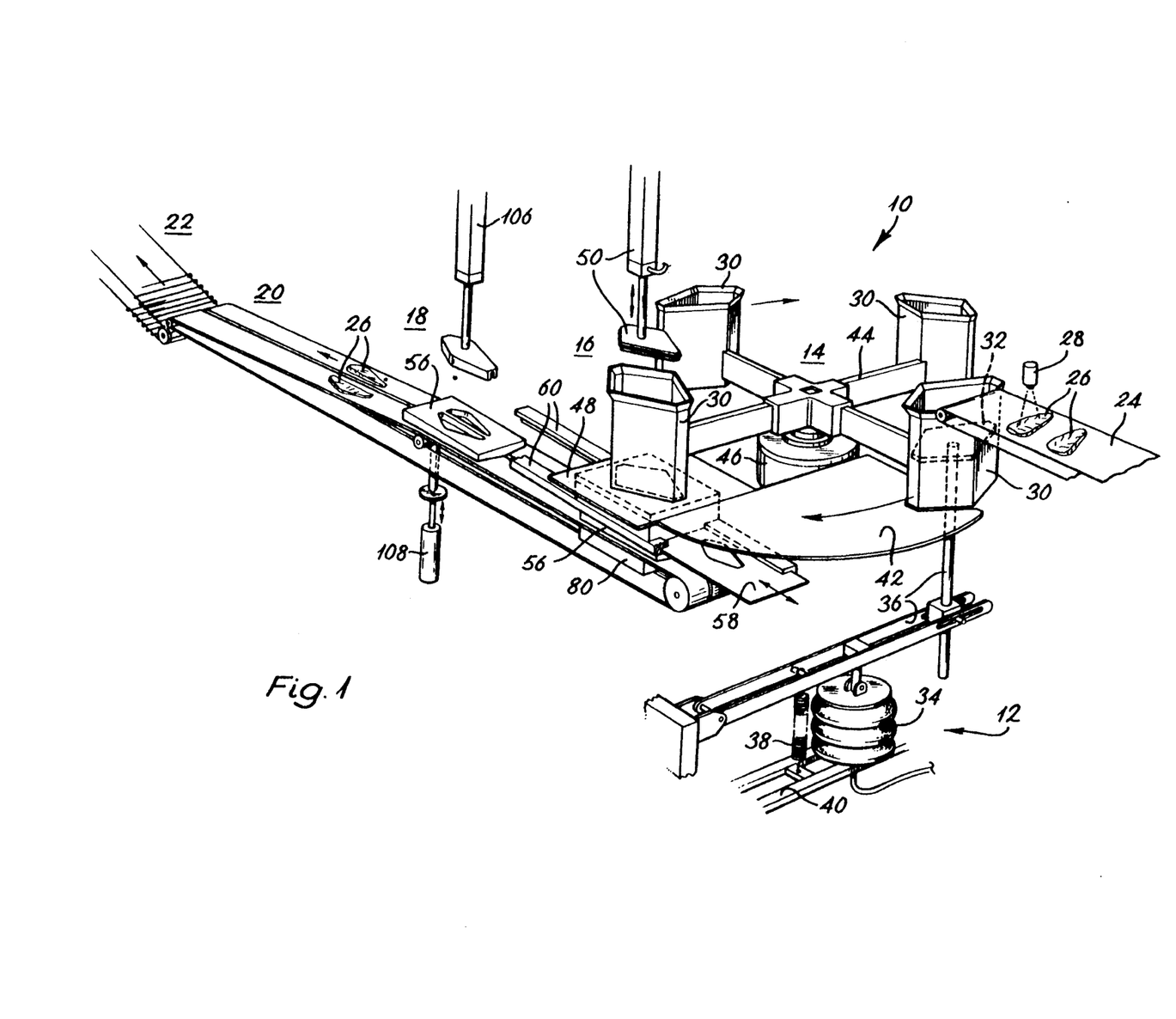
FIG. 1 is a partly schematic perspective view illustrating the more important features of a fish processing apparatus according to a preferred embodiment of the invention.

Thus referring first to FIG. 1, a fish processing apparatus 10 according to the present invention comprises a fillet-loading assembly 12, a rotatable hopper transfer unit 14, a re-forming assembly 16 to produce the desired fillet product, a product de-moulding assembly 18, a discharge conveyor assembly 20 for the demoulded products, and a take-off shuttle conveyor 22 to transfer the products from assembly 20 to a freezing unit (not shown).

In more detail, the fillet-loading assembly 12 comprises a feed conveyor 24 arranged to carry fillets 26 under a photoelectric detector cell 28 for discharge into one of four appropriately-shaped hoppers 30. Hoppers 30 are each adapted to receive, in turn, the same displaceable floor member 32.

Conveniently, the conveyor 24 and its supporting structure are continuously moved bodily backwards and forwards and from side-to-side by an appropriately programmed ram system (not shown) to ensure that the fillets 26 are evenly spread across the hopper floor.

The position of the hopper floor member 32 is controlled by an inflated bellows 34. This latter acts through a pivoted linkage 36 against the downward bias of a tension spring 38 which is secured on the same piece of framework 40 as the bellows.

Initially, the bellows 34 will be at the maximum extension allowed so that the floor member 32 is very near the top of the associated hopper thereby to encourage the fillets 26 to maintain their horizontal disposition when they are discharged into the hopper.

The photoelectric detector device 28 produces a sensor signal acting through a transducer (not shown) to bleed air out of the bellows as each fish passes, thus controlling the lowering of the floor member 32. The spring 38 assists in retraction of the bellows (more necessary as the bellows nears its empty state). The reciprocating movement of the feed conveyor 24, back and forth, and from side to side, ensures that the hopper floor is evenly covered with fish.

The speed of bellows operation is so related to the travel speed of the feed conveyor 24 and its supporting structure between one hopper floor setting and the next, that at all times, the fillets discharged into the hopper only experience a minimal drop and retain their horizontal disposition on entering the hopper.

When, eventually, the hopper is fully loaded, the floor member 32 will lie adjacent the bottom edges of the hopper walls and in the same plane as a support table 42 which, as shown, has a cut-out to receive it.

As can be seen from FIG. 1, the hopper 30 adjacent the feed conveyor 24 is one of four such hoppers supported on a cruciform indexing unit 44. Unit 44 is, in turn, mounted on the shaft of a pneumatic actuator 46 which is under the control of microswitches (not shown).

As will be hereinafter described in more detail, the unit 44 is indexed by a pneumatic valve so as, at the appropriate moment, to rotate unit 44 by 90° to bring the next (empty) hopper adjacent the feed conveyor 24 while that already loaded is moved on to the re-forming assembly 16. The bellows 34 is then re-expanded to return the hopper floor member 32 to its original height at the top of the new hopper and loading continues as before.

During its passage from one position to the next, the material in the loaded hopper 30 is supported first by the support table 42 and then by the top plate 48 of the re-forming assembly 16.

With reference also to FIGS. 2 to 10, it will be seen that re-forming assembly 16 comprises a plunger 50 adapted to enter the top of the newly arrived hopper 30, a converger block 52 separated from the top plate 48 by a spacer 54, and a mould 56 separated from the base of the converger block by a cutter plate 58.

The cutter plate is supported in guides 60 secured to the bottom edges of the converger block for movement in an inclined plane (FIG. 3) between (i) a first position in which a correspondingly shaped aperture 62 in the plate aligns with the lower end of the hopper bore and (ii) a second position in which the hopper space (effectively extended by the top plate 48, spacer 54 and converger block 52) is sealed off by the uninterrupted second section 64 of the cutter plate. Reference numeral 66 (FIG. 3) indicates the actuating ram for the plate.

The split "coffin-form" plan shape of the mould 56 (best seen from FIGS. 7 to 9), the shallow downwardly-tapering V-shape of its underside when seen in transverse section (FIG. 2), and the deliberately inclined cutting plane of the plate 58 (FIG. 3), together result in a fillet product which is a very realistic imitation of the genuine article.

Figures 2, 3:
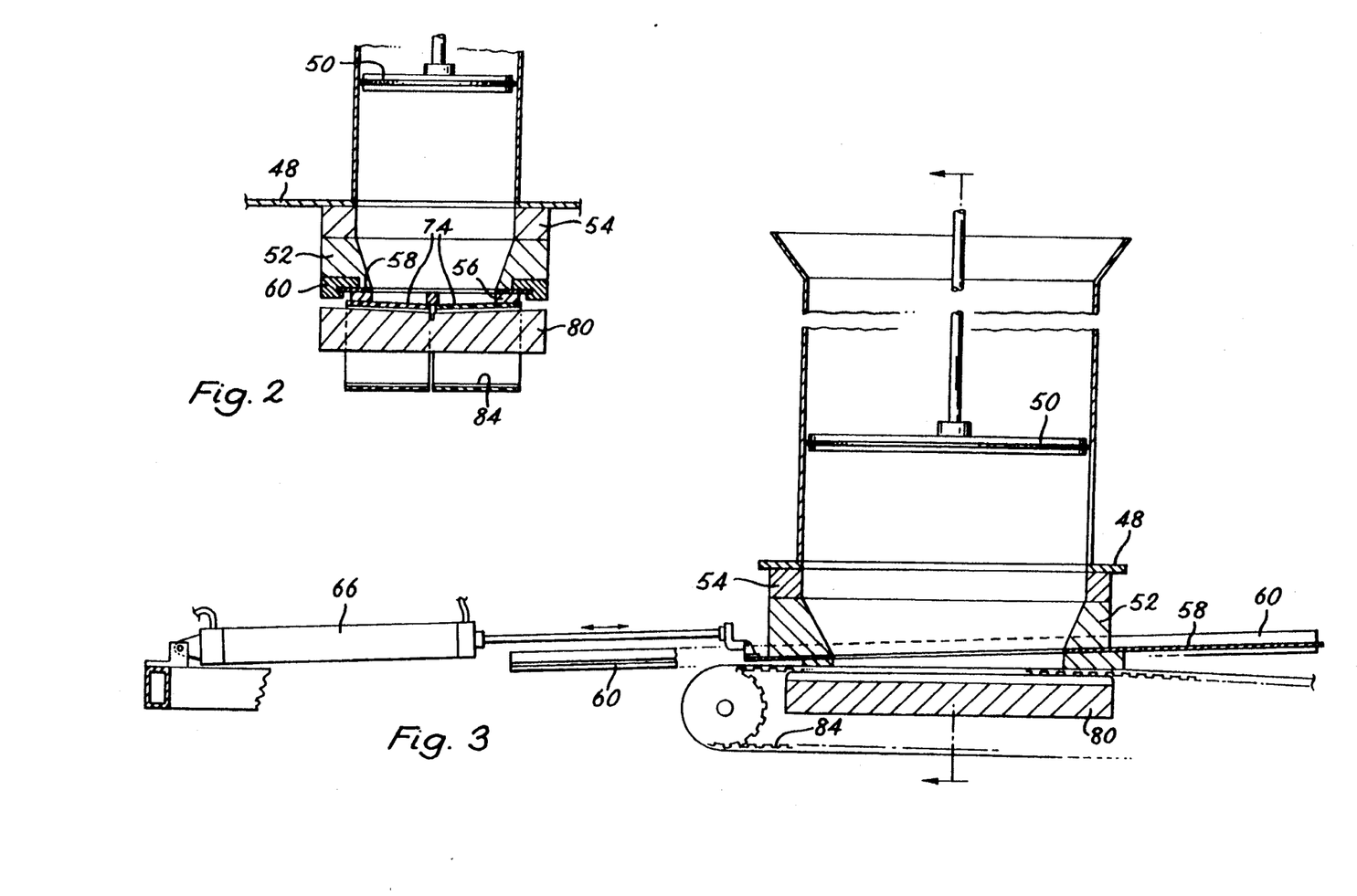
FIGS. 2 and 3 are respectively transverse and longitudinal sections through a mould-loading and forming assembly in the apparatus.
Figure 4:
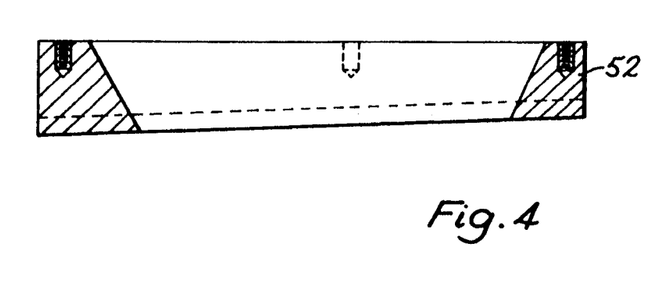
FIGS. 4, 5 and 6 are respectively longitudinal and transverse sections and a plan view of a converger block located between a loading hopper and the mould.
Figure 5:
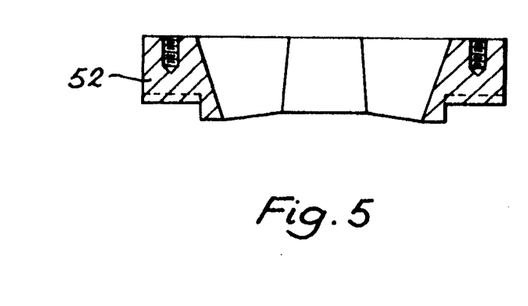
Figure 6:
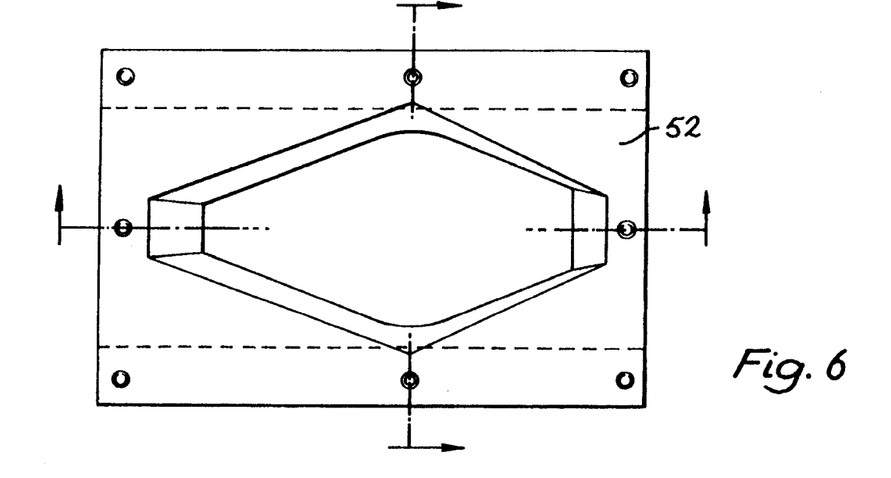
Figure 7:
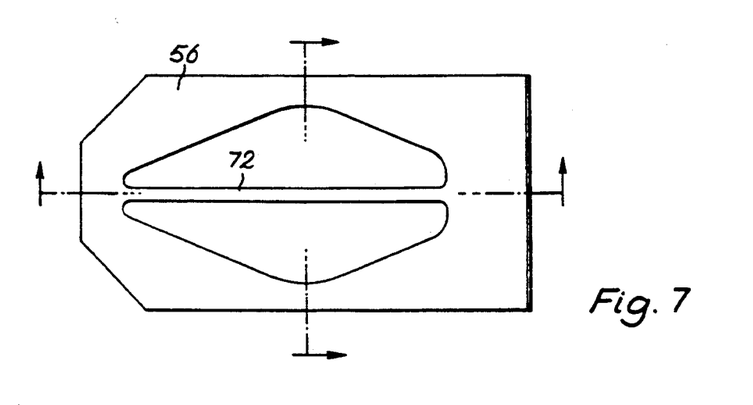
FIGS. 7, 8 and 9 are respectively a plan view and longitudinal and transverse sections of the mould.
Figure 8:
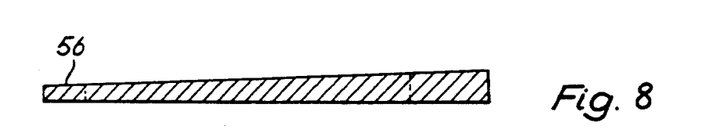
Figure 9:
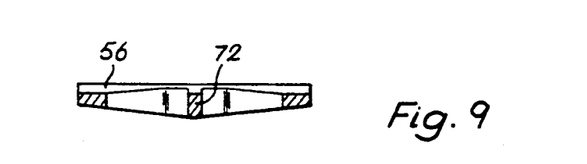
Figure 10:
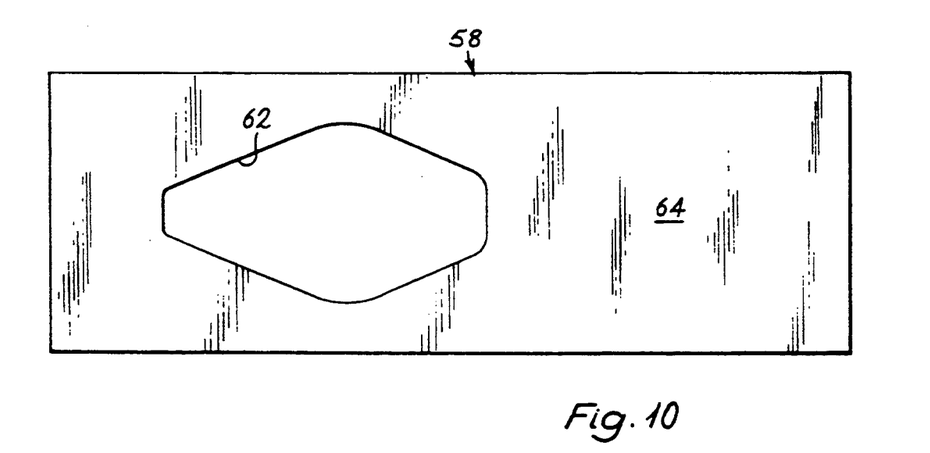
FIG. 10 is a plan view of a cutting plate used to separate material in the mould from material in the converger block.

In an alternative design of mould for producing a so-called "block fillet" product, the central rib 72 of the mould is absent. FIG. 3 illustrates the appearance of this alternative mould design when viewed from the side insofar as the central rib 72 of the "single fillet" mould 56 has deliberately been omitted from this Figure for greater clarity.

Returning now to FIG. 2, the tapering underside of the mould (which will normally correspond to the top surface of the fillet product when it is eventually packaged for sale) is engaged by the two discharge belts 74 of the assembly 20 (see also FIGS. 10 to 14). To set the required belt-inclination for this to happen (typically 170°), the belts 74 are supported at their rearward extreme by a waisted roller 76 (FIG. 11) which is chain-driven via a sprag clutch 78 (FIG. 14) and this inclination is maintained beneath the mould 56 by a suitably-profiled belt-support block 80 (FIG. 2) and a special design of auxiliary support roller 82 (best seen from FIGS. 11 to 13).

Sideways drift of the belts 72 in this region is prevented by radial flanges on roller 76 (FIG. 11) and longitudinal slip is prevented by transverse ribs 84 (FIG. 2) provided on the inner surface of the belts to mesh with correspondingly-spaced teeth (not shown) on the driving roller 76.

The purpose of the sprag clutch 78 in the drive system of FIGS. 11 to 14 is to give an intermittent motion to the belts 74 as will be hereinafter described and this enables the mould 56 to move away from the re-forming assembly 16 without relative motion between the mould and the supporting belts.

Figure 15:
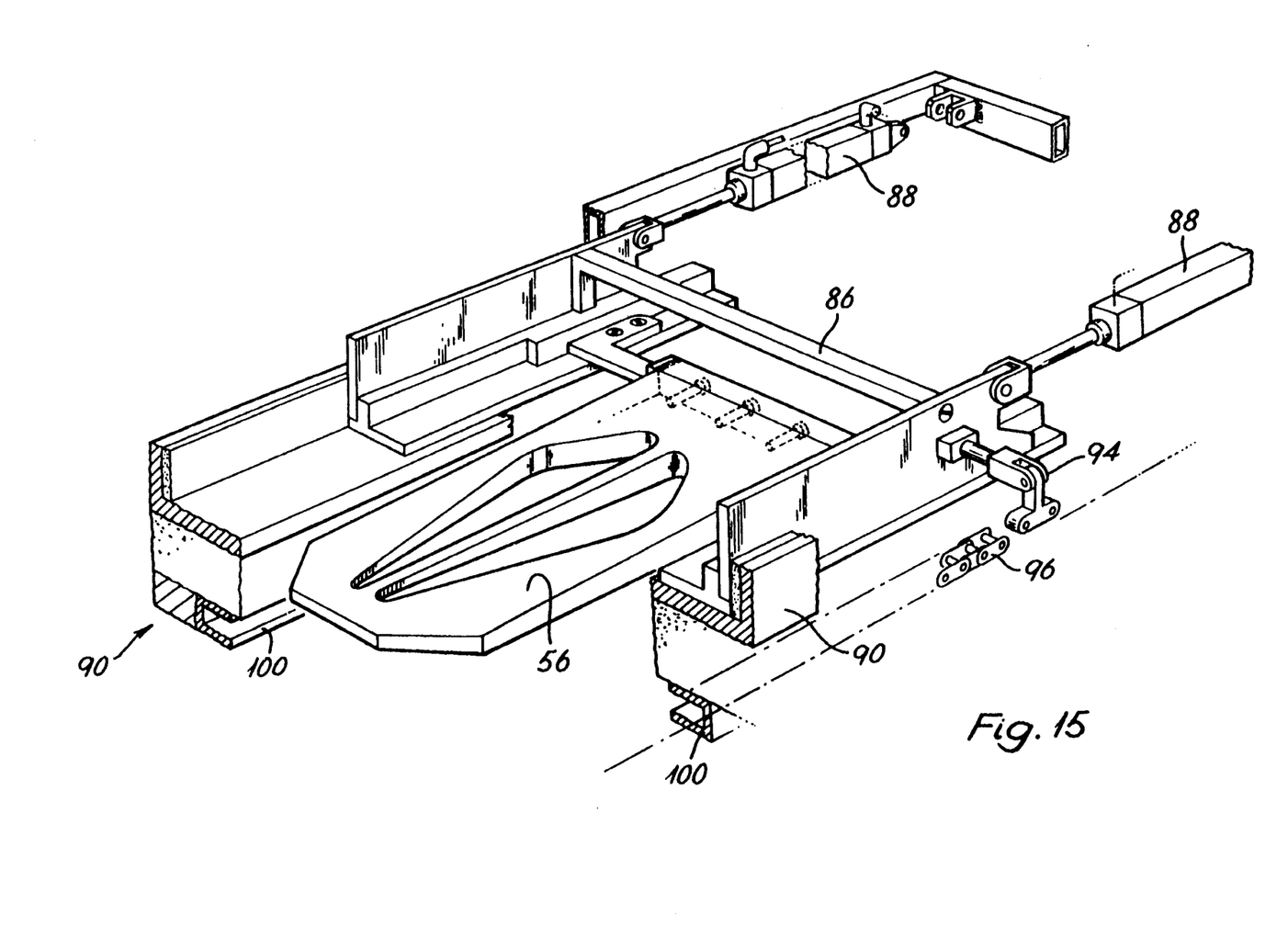
FIG. 15 is a perspective view of the mould and a drive mechanism for moving it from the re-forming station to the product-release mechanism.

The mechanism for moving the mould 56 is best illustrated in FIG. 15 from whence it will be seen that the mould is supported on a carriage 86 driven by a pair of rams 88 between its two operative positions.

Carriage 86 is also provided with a means (not shown) for restraining it from lifting as it reciprocates. This restraint means could, for example, take the form of a roller on the end of an arm fixed to the carriage 86 and acting on the underside of the top plate 48. Alternatively, it could be provided by the carriage-supporting guide rails 90 (suitably modified).

Figure 11:
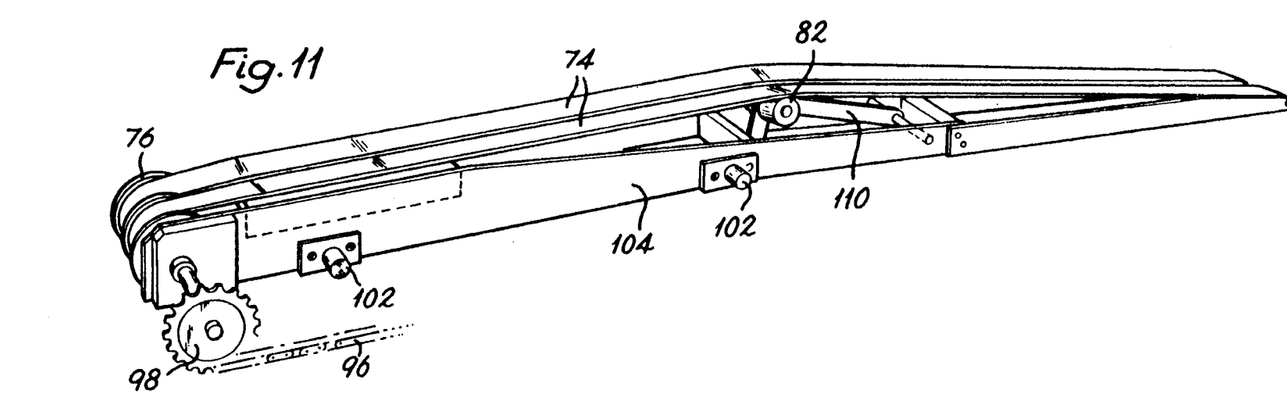
FIGS. 11 and 12 are respectively perspective and side views of a discharge belt assembly for removing the loaded mould from the re-forming station.

The sides of the rails 90 are faced with strips of low-friction material (such as Delrin) to reduce friction losses and a lug 94, extends from the sides of the carriage for connection with one link of the drive chain 96 for roller 76 (see also FIG. 11). This chain operates through a sprocket wheel 98 connected to the axle of roller 76 via the sprag clutch 78 referred to earlier. This ensures that when the rams 88 extend to move the mould 56 away from the re-forming assembly 16, the belts 74 move with it, whereas when the rams retract to move the mould back to its original position, the sprag clutch freewheels and the belts 74 remain stationary.

Support beams 100 secured beneath the guide rails 90 (FIG. 15) are provided with notches (not shown) to accept the location lugs 102 of the discharge belt support framework 104 (FIG. 11) and it will be observed that the auxiliary roller 82 is pivotally mounted on this framework so that it can move downwardly with the fillet product when this latter is released from the mould by the plunger 106 of the demoulding assembly 18. This ensures that the fillet products continue to be firmly supported even when they have left the confines of the mould 56.

Figure 12:
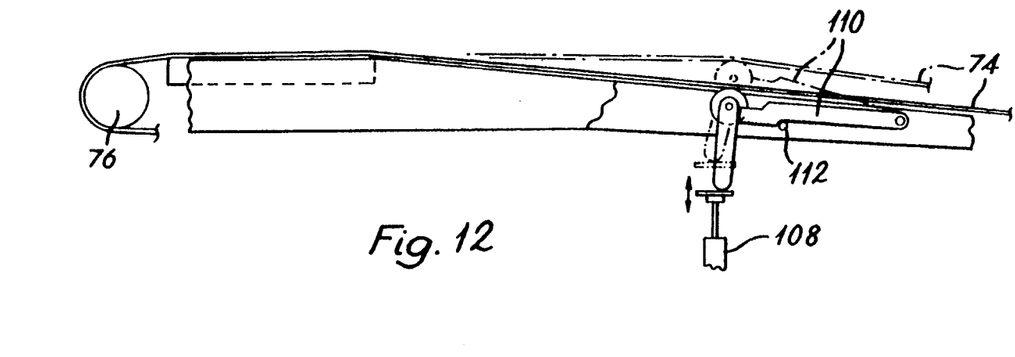
Figure 13:
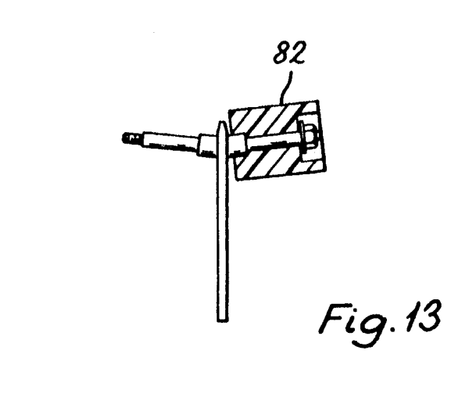
FIG. 13 shows a detail, partly in transverse section, of the belt-support arrangement used in the discharge belt assembly.

The height of roller 82 is determined by a ram 108 engaging with the roller mount 110. FIG. 12 shows the lowest position of the roller in full lines (with mount 110 engaging with a stop 112) and its highest position in broken lines. In practice, the ram 108 will be operated so that, following de-moulding of the fillet product, the belts 74 are not raised again until the mould 56 has been returned to the re-forming assembly 16 for a repeat operation.

When repeated operations have finally resulted in the emptying of the previously charged hopper 30 at the re-forming assembly 16, the plunger 50 will be withdrawn from the hopper and the demoulding assembly 18 will be swung to one side by a ram 114 (FIG. 14) to allow a newly-loaded hopper to be brought into place without obstruction. The demoulding assembly is then returned to its original position by the ram 114 and the cycle repeats.

Figure 14:
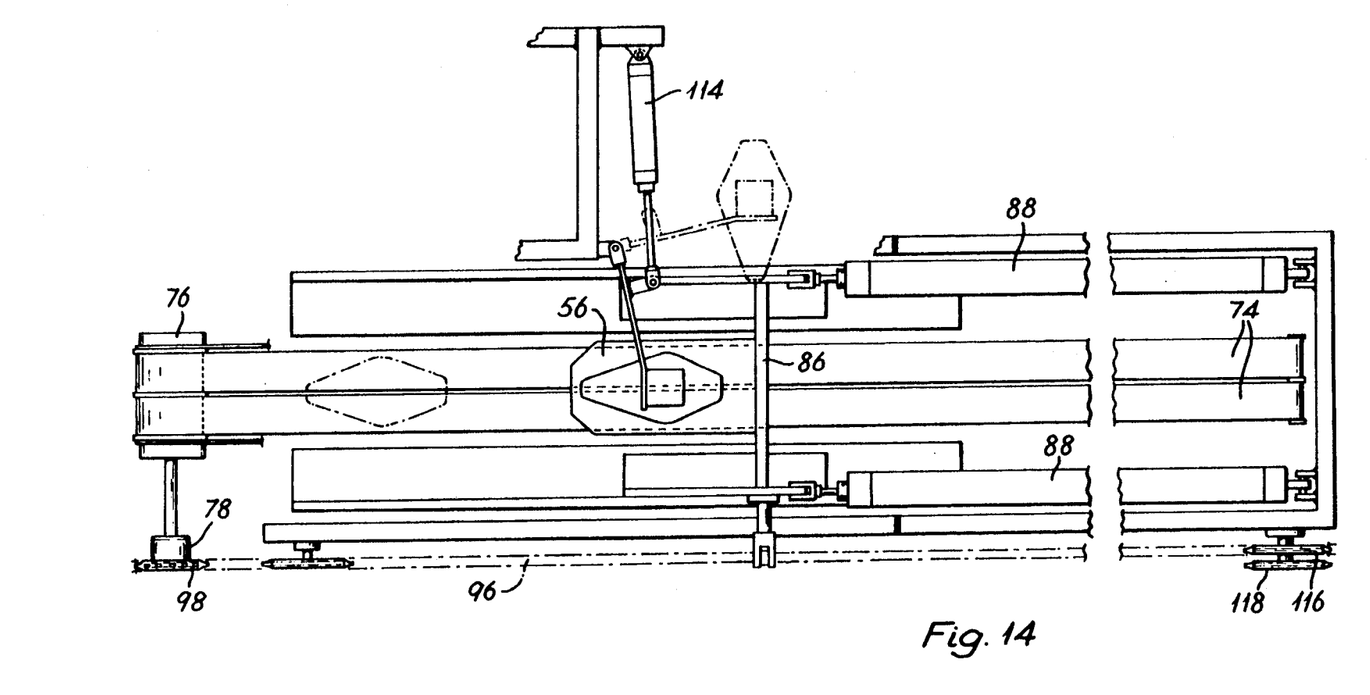
FIG. 14 is a simplified scrap plan view illustrating alternative positions of the demoulding assembly.

It will further be observed from FIG. 14, that the axle for the rearmost support sprocket 116 for the drive chain 96 also carries a drive sprocket 118 for the (Koppens-type) take-off conveyor 22 shown in FIG. 1 so that this latter conveyor moves in phase with the belts 74.

Figure 16:
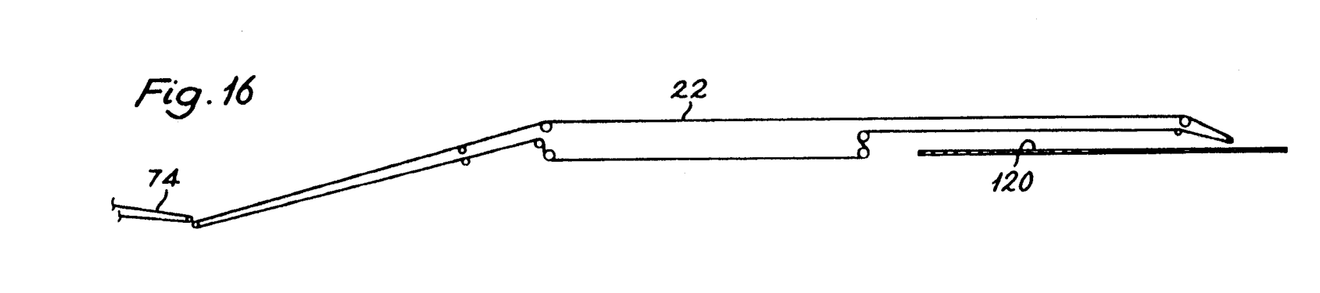
FIGS. 16 and 17 are partially diagrammatic side views (taken at two different stages of operation) of a shuttle conveyor assembly for transferring fillet products from the discharge belts to a transverse feed belt for a freezer.
Figure 17:
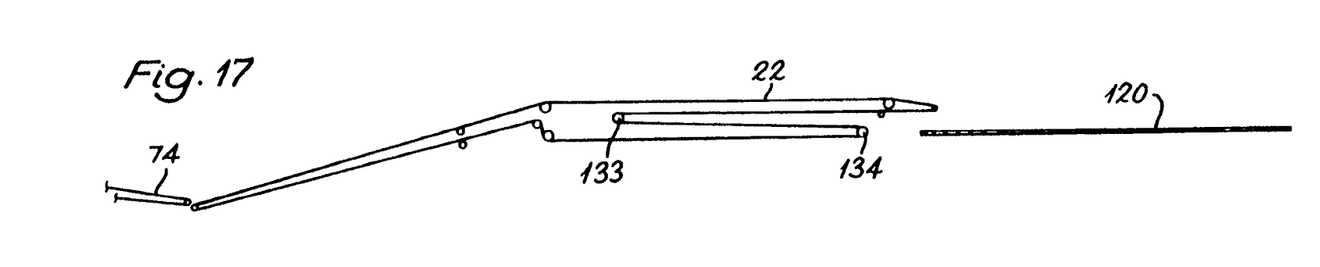

FIGS. 16 and 17 are simplified side views showing the operation of the shuttle conveyor 22 in loading fillet products received from the discharge belts 74 on to the stainless steel or plastics belt 120 of a continuous freezing unit (not shown) or into trays, say, for freezing in a cabinet freezer.

Figure 18:
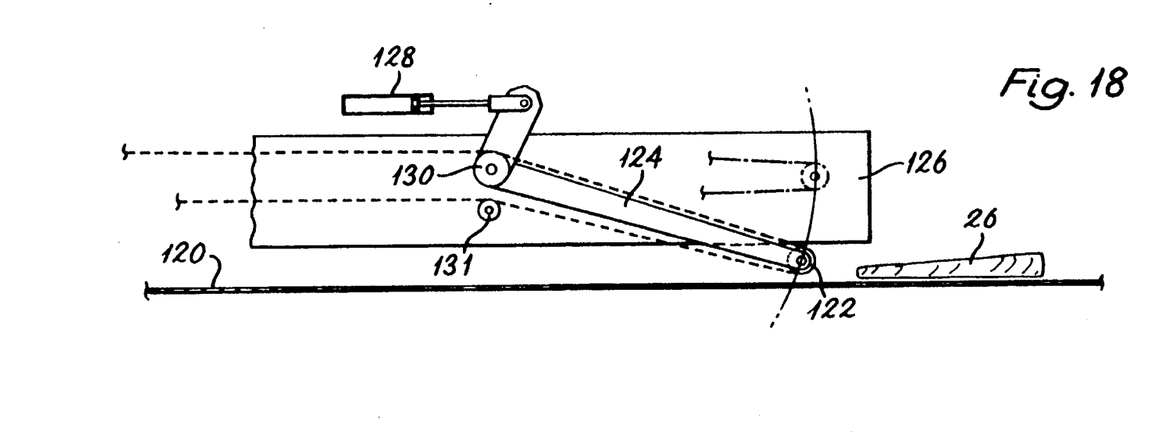
FIG. 18 shows (on a larger scale) a detail of the shuttle conveyor assembly at its discharge end adjacent the transverse feed belt.

FIG. 18 diagrammatically illustrates the way in which the distal end of the conveyor 22 moves around a roller 122 secured to one end of a bell crank lever 124. This latter is pivotally mounted on a carriage 126. A pair of matching rams, such as ram 128, also mounted side by side on the carriage, is effective to rock the lever 124 and move the end roller 122 between a lower position (shown in full lines) and an upper position (shown in broken lines).

The preceding support rollers 130,131 for conveyor 22 are also mounted on the carriage 126 as is the upper roller 133 of a pair of rollers 133,134 located in the return run of the conveyor 22 to form an S-shaped configuration in the conveyor. Roller 134 is fixed to a frame which carries the track for the carriage 126.

As has been already described, the shuttle conveyor 22 moves intermittently in synchronism with the intermittently moving discharge belts 74 and, in operation, the discharge end of the shuttle conveyor 22 will withdraw from a first position in which, nose down, it deposits a first fillet product on the far side of the freezer input belt 120, to a second position over the nearer side of the belt 120 in which it deposits the last product on belt 120 before raising its nose (FIG. 17) and returning to the far side of belt 120 for deposit of the next row of fillet products to be frozen.

The purpose of having the nose portion of the shuttle conveyor vertically movable is so that, in the nose down position, there is minimal drop as it deposits the fillet products on the freezer feed belt 120, whilst in the nose-up position, the shuttle conveyor is able to immediately move back to the far side of the belt without disturbing the row of fillet products which has just been deposited there. It will be appreciated, of course, that the operational speeds of the various components involved is such that by the time the nose position of the shuttle conveyor is dropped down for discharge onto the far side of the belt 120 again, the previous row of fillet products deposited there will have moved clear of the shuttle conveyor.

Figure 19:
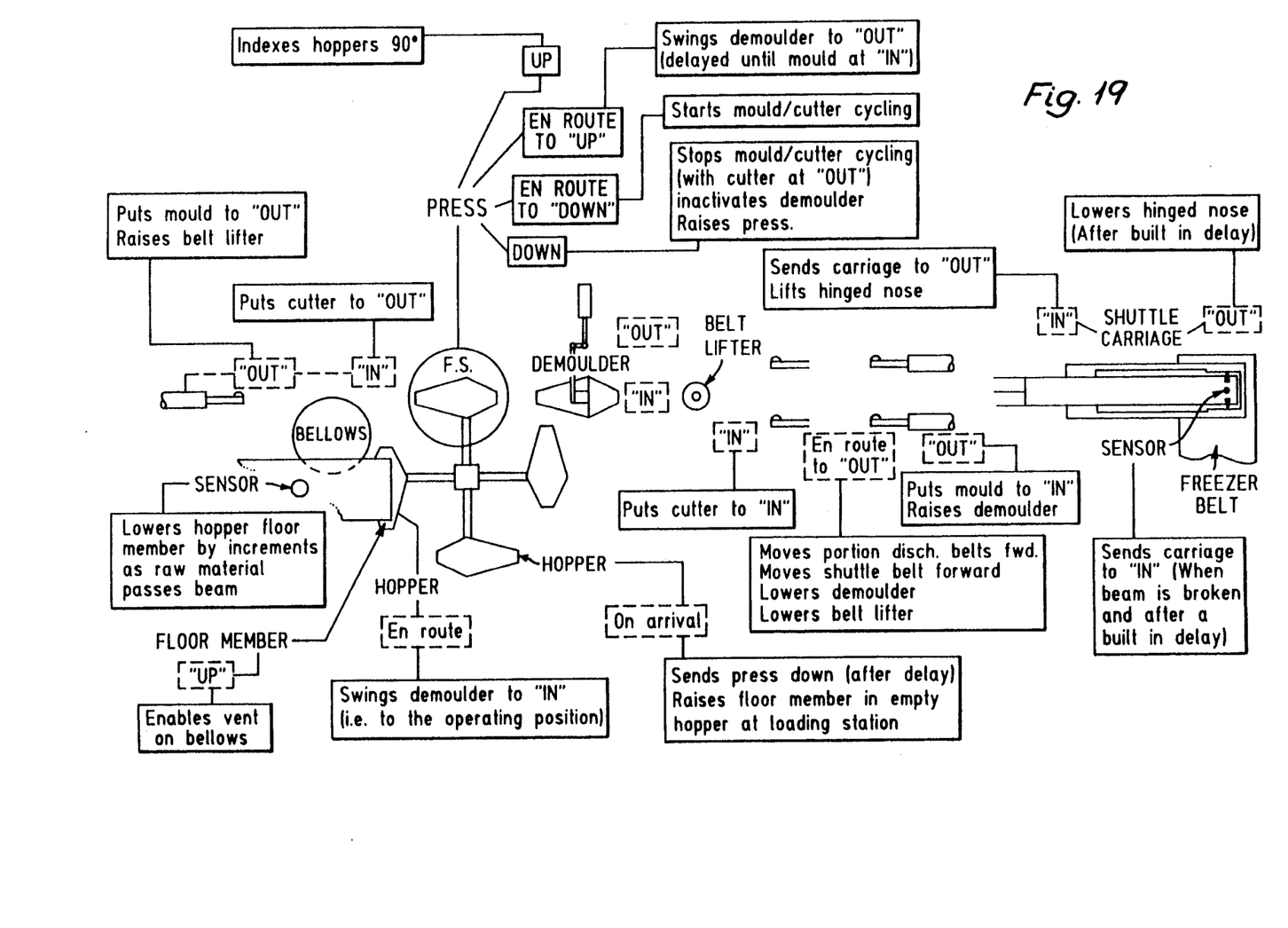
FIG. 19 illustrates, in diagrammatic form, the more important features of a control assembly for use in the apparatus of the earlier Figures.

FIG. 19 shows in simplified schematic form the control circuitry for the illustrated apparatus. In this Figure, the mould position is denoted as "IN" when the mould is below the hopper and as "OUT" when it is at the demoulding station. Similarly, the cutter position is denoted as "IN" when the mould is open to the hopper via the cutter blade aperture 62 and as "OUT" when the hopper is isolated by section 64 of the blade. The rest of FIG. 19 will be self-explanatory when read in the context of the apparatus as herein described.

Figures 20, 21:
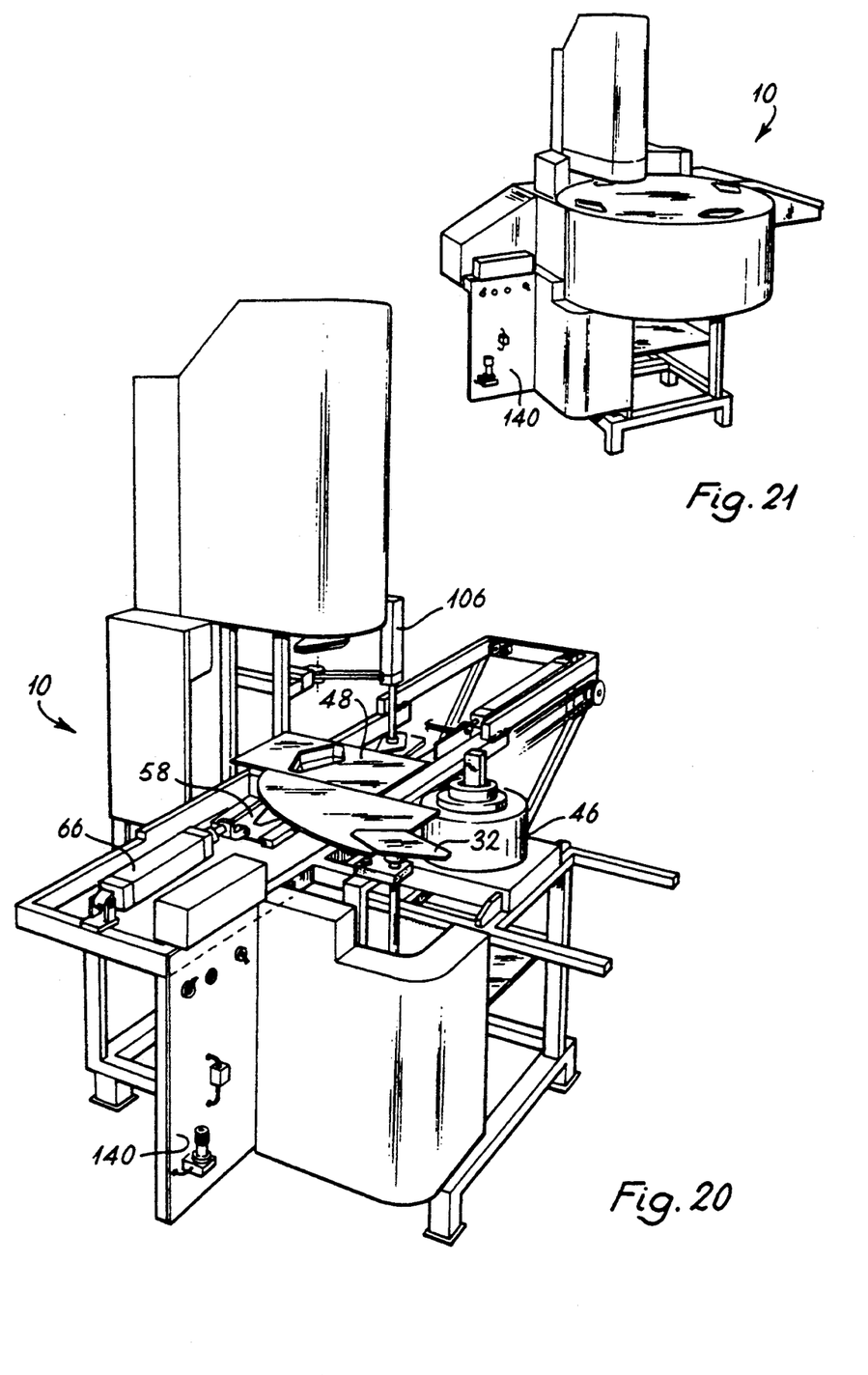
FIG. 20 shows a perspective view of a fish re-forming machine for use in the assembly with part of its protective housing in place.
FIG. 21 shows the same machine fully fitted and ready for use.

FIGS. 20 and 21 show the fish processing apparatus of the earlier Figures as it will appear with the protective casing partly (FIG. 20) and wholly (FIG. 21) in place. In these two Figures the control panel for the apparatus is schematically illustrated at 140.

In operation, after the initial start up, indexing the hoppers move the demoulding assembly to the operating position. The arrival of a hopper at its destination (i.e. an empty hopper at the loading station and a full hopper at the forming station) starts the plunger 50 at the forming station moving in a downwards direction. This in turn, after a built-in delay, initiates the mould-/cutter reciprocating cycle and fish portions are produced and leave the machine via the discharge belt 74. The basic series of events in the mould/cutter cycle are as follows: (a) mould arriving at "IN" puts cutter to "IN"; (b) cutter arriving at "IN" puts cutter to "OUT" (after built-in delay); (c) cutter arriving at "OUT" puts mould to "OUT"; and (d) mould arriving at "OUT" puts mould to "IN". (The mould/cutter cycle continues as above until the hopper is empty).

As well as this basic mould/cutter cycle, the mould en route to, and arriving at, its "OUT" position activates and then retracts the plunger 106 of the demoulding assembly. In addition, the belt support roller 82 is raised when the cutter reaches its "OUT" position and is lowered as the mould moves outwards.

On arrival of an empty hopper at the loading station, the retractable hopper floor member 32 rises in the empty hopper, prior to filling. The filling is done in a controlled manner by the raw material passing the sensor 28 which vents the bellows 34 as already described, to gradually lower the hopper floor member.

As fish portions are produced by the apparatus, the charged hopper at the forming station gradually empties and the forming plunger 50 moves continually downwards until it eventually reaches its lowest level whereupon it activates the appropriate part of the control circuit and is retracted. As plunger 50 retracts, it causes the demoulding assembly 18 to swing out, thereby allowing room for the now empty hopper at the forming station to be indexed 90° when the forming plunger 50 eventually reaches its uppermost limit. Indexing the hoppers repeats the operation just described. A summary of this operational cycle is given below in tabular form.

| ACTION | RESULT |
|---|---|
| Hopper en route. | Swings demoulding assembly to "IN". |
| Hopper arrives. | Starts forming plunger on way down. |
| | Raises floor member in empty hopper at loading station. |
| Floor member fully up in empty hopper. | Enables vent on bellows. |
| | Starts feed conveyor. |
| Raw material passes | Vents bellows. |

| ACTION | RESULT |
| --- | --- |
| sensor. | Fills hopper as floor member drops (Feed conveyor is stopped when hopper is full; this will be before the hopper at the forming station is empty). |
| Forming plunger en route to "DOWN". | Starts mould/cutter cycle. |
| Mould and cutter cycling. | Fish portions formed and discharged to belts 74 (demoulder and belt lifter raised and lowered at appropriate times in cycle). |
| Forming plunger fully down (hopper empty). | Stops mould/cutter cycle. Inactivates demoulding assembly. Starts forming plunger on way up. |
| Forming plunger en route to "UP". | Swings demoulding assembly "OUT". |
| Forming plunger fully "UP". | Indexes full hopper to forming station. Indexes empty hopper to loading station. |
| Hopper en route. | Repeat as before. |

Advantageous features of the invention include: (a) the ability to produce realistic-looking fillet products which are tapered from one edge to the other and from nose to tail; (b) the use of discharge belts (as well as the more conventional pusher) to allow more delicate fillet-products with a larger surface area to be satisfactorily discharged; (c) the use of a slicing blade to separate material in the mould from that remaining in the hopper so as to produce a portion with less minced material; and (d) the use of a modified Koppens-type shuttle conveyor (22) to enable more delicate products to be handled without damage.

In a modification (not shown) of the illustrated embodiment, the two belts 74 are replaced by four or more circular cross-section belt members spaced apart, side by side, across the width of the machine and supported, at the re-forming station, in the appropriately spaced longitudinal channels of a bottom platen member. This latter automatically drops away from beneath the belt members at the demoulding station and returns to the re-forming station in readiness for the next re-forming operation.

In another modification (FIG. 22), the illustrated feed system is replaced by a feed system 150 in which orientated fillets are carried on a conveyor belt 152 towards the loading section of the re-forming machine.

Figure 22:
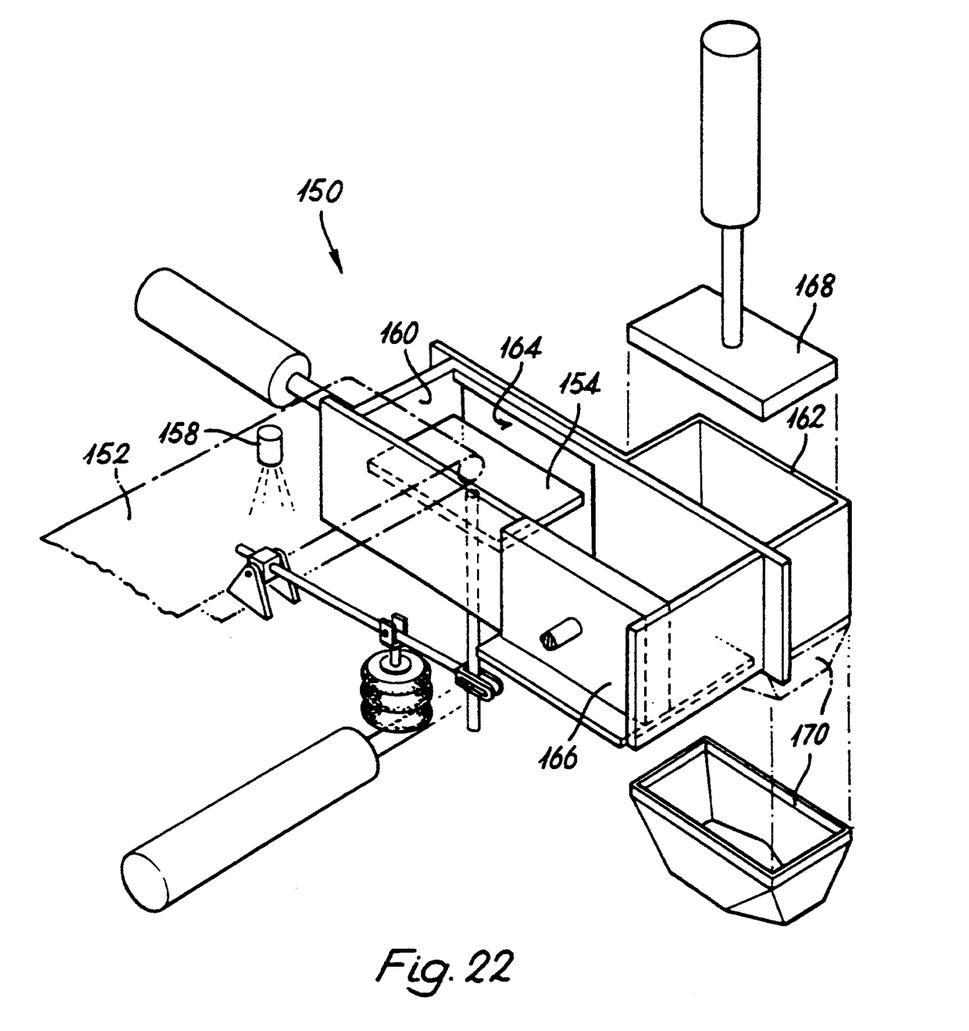
FIG. 22 shows a perspective view of an alternative loading system for the mould.

At the start of the loading cycle, a retractable table 154 is at its highest position immediately below the end of the conveyor belt 152. As each fillet on the conveyor belt 152 passes beneath a photoelectric detector 158, a signal from the detector is sent to a mechanism controlling the position of the table 154 causing the table to drop slightly. This ensures that the fillet drops a minimum distance and is therefore more likely to stay in a horizontal position.

The conveyor belt 152 can be made to reciprocate and move from side to side ensuring an even spread of fillets on the table 154.

When the table 154 has dropped to a predetermined position, the conveyor belt 152 stops. A right-angled pusher 160 now moves the stack of orientated fillets across to a position opposite a waiting hopper 162. The pusher 160 is designed so that an opening 164 in one of its side walls is at this stage opposite the hopper 162. A second pusher 166 now moves forward and pushes the stack of fillets through the opening 164 and into the hopper 162. The pusher 166 then retracts, followed by pusher 160.

After retraction of the two pushers, a press 168 moves down into the hopper 162 and squeezes the fillets through a converger 170 into a re-forming section (not shown) where the portions are produced. When the press 168 drops to a predetermined point, the forming mechanism is stopped and the press 168 retracts. In addition, the table 154 returns to its original position for reloading and the cycle is repeated with a new batch of fillets.

It is envisioned that in addition to fish, the apparatus of the present invention (suitably modified, if necessary) may also be used with other materials if desired e.g. meat and poultry.

We claim:

1. An apparatus for forming a reconstituted food product comprising:
   at least one transfer hopper having a reciprocating bottom for supporting pieces of the food product at a loading location;
   control means for reciprocating said bottom so as to alter the height of said bottom in relation to a load in the hopper thereby keeping a drop height of successive pieces of food product into the hopper within predetermined limits;
   drive means for moving said hopper from a food product loading location to a discharge location;
   a mould disposed at said discharge location and aligned with the hopper;
   displacement means for displacing material from said hopper into said mould;
   means for separating material in said mould from material remaining in said hopper;
   second drive means for moving the loaded mould to a demoulding location;
   conveying means disposed from the demoulding location to a discharge position; and
   explusion means disposed at the demoulding location for expelling material from the mould to the conveyor means.

2. An apparatus as claimed in claim 1 further comprising a loading assembly having a substantially horizontal input conveyor which is continuously moved backwards and forwards and from side-to-side in controlled fashion to ensure that constituent pieces for the food product are evenly spread across a floor of the transfer hopper.

3. An apparatus as claimed in claim 2 wherein the control means includes an expansion member which, at a maximum allowable extension, brings the hopper bottom at or adjacent a top of the hopper thereby permitting the constituent pieces for the product to maintain a horizontal disposition when they are discharged into the hopper.

4. An apparatus as claimed in claim 3 in which, when the hopper is fully loaded, the hopper bottom will lie adjacent bottom edges of hopper walls and lie in the same plane as a support table shaped to receive the hopper bottom.

5. An apparatus as claimed in claim 4 in which the hopper is one of a plurality of hoppers supported on an indexing unit, said indexing unit rotating, at an appropriate moment, by an amount required to bring an empty hopper adjacent the input conveyor while a hopper which has been already loaded from the input conveyer has been moved to the mould, whereupon the expansion member is re-expanded to return the hopper bottom to its original height at the top of said empty hopper and allowing loading to continue.

6. An apparatus as claimed in claim 3 in which the expansion member is a bellows operative to move the hopper bottom from one setting to another in response to detection of said constituent pieces on the input conveyor, whereby, on entering the hopper, said constituent pieces only experience a minimal drop and retain a horizontal disposition.

7. An apparatus as claimed in claim 1 in which the displacement means comprises a plunger adapted to enter the top of the hopper, and a convergent section, said mould being separated from the convergent section by a cutter plate.

8. An apparatus as claimed in claim 7, in which the cutter plate is supported for movement in an inclined plane between a first position, in which a correspondingly shaped aperture in the cutter plate aligns with a lower end of a hopper bore, and a second position in which access to the hopper is sealed off by an uninterrupted second section of the cutter plate.

9. An apparatus as claimed in claim 7 in which the mould has a tapering underside engaged by two mutually inclined discharge belts for the demoulded products.

10. An apparatus as claimed in claim 9 in which the mutually inclined discharge belts are supported upstream of the mould by a waisted roller which is driven via a sprag-clutch so as impart an intermittent motion to the two belts, said intermittent motion moving the mould away from a plunger without relative motion between the mould and the discharge belts, whereas, when the mould is moved back to its original position, the sprag clutch freewheels and the two discharge belts remain stationary.

11. An apparatus as claimed in claim 10 in which the waisted roller is driven via the sprag clutch by a sprocket wheel and the mould is supported on a carriage connected with a link of a drive chain for said sprocket wheel.

12. An apparatus as claimed in claim 10 in which discharge ends of the two discharge belts are supported at a desired mutual inclination by a suitably profiled auxiliary roller which is mounted so that it can move downwardly with the reconstituted food products when they are released from the mould by the plunger thereby ensuring that said products continue to be firmly supported even when they have left the confines of the mould.

13. An apparatus as claimed in claim 12 in which, following demoulding of a reconstituted food product, the two discharge belts are not raised again until the mould has been returned to be aligned with the transfer hopper for a repeat operation.

14. An apparatus as claimed in claim 10 further including a take-off conveyor to transfer the reconstituted food products from the conveyor means to a freezer loading belt, said take-off conveyor comprising a shuttle conveyor adapted to move intermittently in synchronism with the intermittently moving discharge belts whereby, in operation, the discharge end of the shuttle conveyor withdraws from a first position in which, nose down, it deposits a first row of the reconstituted food products on a far side of the freezer loading belt and a second position in which it deposits a last row of reconstituted food products on a near side of the freezer loading belt before raising its nose and returning to the far side of the freezer loading belt for deposit of a next row of reconstituted food products to be frozen, operation speeds of the various components involved being such that by a time the nose position of the shuttle conveyor has dropped down for discharge onto the far side of the freezer loading belt again, a previous row of reconstituted food deposited there moves clear of the shuttle conveyor.

15. An apparatus as claimed in claim 2 in which the loading assembly for the constituent pieces for the product includes a retractable table which, at its highest position, is immediately below an end of the input conveyor where, as each said piece on the input conveyor passes beneath an appropriate detector, a signal from the detector is sent to a control mechanism controlling the position of the table to cause the retractable table to drop slightly whereby to ensure that said pieces drop a minimum distance and are therefore more likely to stay in a horizontal position.

16. An apparatus as claimed in claim 15 in which, when the table has dropped to a predetermined position, the input conveyor stops, a first pusher moves a stack of orientated pieces across to a position opposite a waiting hopper, and a second pusher acting at right angles to the first pusher pushes the stack of pieces into the hopper.

17. An apparatus as claimed in claim 16 in which after retraction of the two pushers, a press moves down into the hopper and squeezes the constituent pieces for the food product through a converger into a moulding section for the product, whereby, when the press has dropped to a predetermined point, the press retracts, the table returns to its original position for reloading and the cycle is repeated with a new batch of said pieces.

18. The method as claimed in claim 1, wherein said moulded food product is fish fillet.

19. The method as claimed in claim 18, wherein said process ensures that a texture of said moulded fish fillet is substantially similar to a texture of fish pieces prior to moulding thereof.

20. An apparatus as claimed in claim 1, wherein a plurality of hoppers are provided and wherein means are provided for moving the hoppers between the hopper loading location and the hopper discharge location, whereby when one of said plurality of hopper is located at the hopper loading location, another of said plurality of hoppers is located at the hopper discharge location.

21. An apparatus as claimed in claim 20, further including a stationary load support means positioned to support the load within the loaded hopper during their passage between the hopper loaded and hopper discharge locations.

22. An apparatus as claimed in claim 1, further comprising a retractable conveyor support disposed at the demoulding location, and a conveyor support drive, whereby the conveyor means moves with the product during demoulding to provide a similarly moving support surface for the food product throughout a demoulding process.

23. An apparatus as claimed in claim 22, further comprising a retractable conveyor support disposed at the demoulding location, and a conveyor support drive, whereby the conveyor means moves with the product during demoulding to provide a similarly moving support surface for the food product throughout a demoulding process.

24. An apparatus as claimed in claim 1, further comprising downwardly convergent duct means connecting the bottom of said transfer hopper to a top of said mould, and cutter plate means separating said mould from said downwardly convergent duct means.

25. An apparatus as claimed in claim 23, further comprising downwardly convergent duct means connecting the bottom of said transfer hopper with a top of said mould, and cutter plate means separating said mould from said downwardly convergent duct means.

26. A method for reconstituting a food product comprising the steps of:
   directing successive pieces of food product into a hopper at a food loading location, said hopper having a reciprocating bottom portion for supporting said pieces;
   altering a height of said bottom portion in relation to a load in the hopper to keep a drop height of said pieces into the hopper within a predetermined limit;
   moving said hopper from the food loading location to a discharge location;
   displacing pieces of the food product in said hopper into a mould;
   moulding said food product while separating pieces-of-food product remaining in said hopper from said mould;
   removing said moulded food product from said mould; and
   conveying said moulded food product to a collection location.

* * * * *